United States Patent [19]

Harzer

[11] 3,751,708
[45] Aug. 7, 1973

[54] SWEEP CIRCUIT FOR OSCILLOSCOPE
[75] Inventor: Peter Harzer, Eningen, Germany
[73] Assignee: Wandel u Goltermann, Reutlingen, Germany
[22] Filed: May 14, 1971
[21] Appl. No.: 143,499

[30] Foreign Application Priority Data
   May 14, 1970   Germany.................. P 20 23 548.7

[52] U.S. Cl.......................... 315/22, 315/25, 315/29
[51] Int. Cl............................................. H01j 29/80
[58] Field of Search .................... 315/22, 25, 28, 29

[56] References Cited
UNITED STATES PATENTS

| | | | |
|---|---|---|---|
| 3,015,753 | 1/1962 | Wolf................................ | 315/29 X |
| 3,281,623 | 10/1966 | Peterson et al...................... | 315/22 |
| 3,405,312 | 10/1968 | Huffnagle ............................ | 315/25 |
| 3,423,628 | 1/1969 | Best..................................... | 315/22 |
| 3,473,079 | 10/1969 | Adornetto et al. .................. | 315/22 |

Primary Examiner—Leland A. Sebastian
Attorney—Karl F. Ross

[57] ABSTRACT

The beam of a cathode-ray tube, normally suppressed, is electromagnetically deflected by a triangular current in the $x$ direction and by a sinusoidal current of substantially higher frequency in the $y$ direction, thereby producing an invisible grid on the oscilloscope screen. Whenever the $y$-deflection signal matches an input signal to be visualized, the beam is turned on for a small fraction of a $y$-sweep cycle during which the $y$ sweep is interrupted whereby a short horizontal trace is produced on the screen. For tracing a horizontal base line in response to a given reference signal, the $x$ sweep may be momentarily accelerated to the frequency of the $y$ sweep which in this case is interrupted for a full cycle; this acceleration takes place on every $n^{th}$ intersection of the $y$ sweep with the imaginary base line.

16 Claims, 10 Drawing Figures

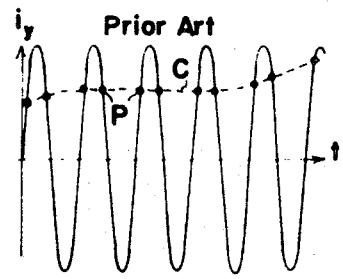
FIG. 1
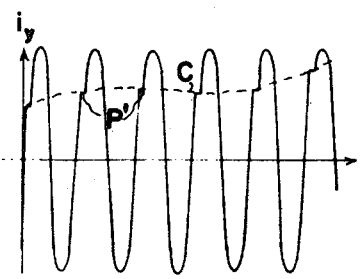
FIG. 2
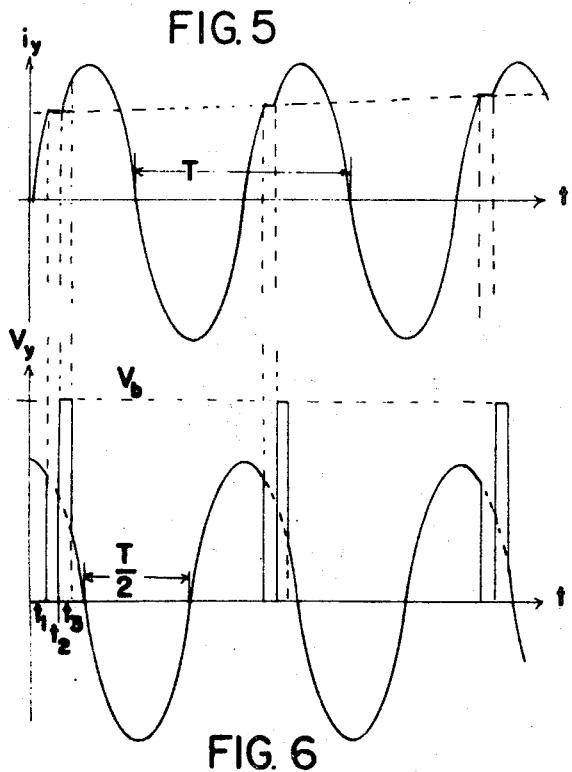
FIG. 5
FIG. 6
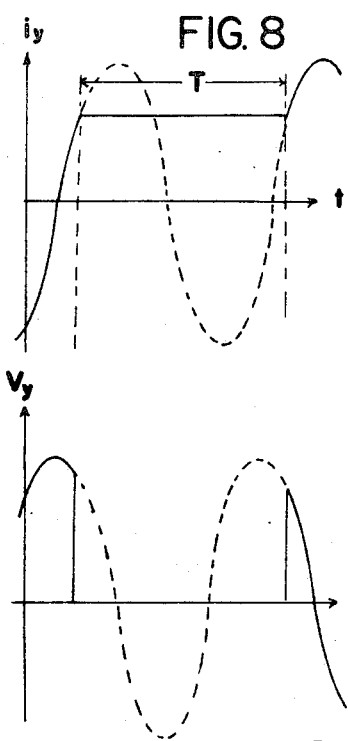
FIG. 8
FIG. 9
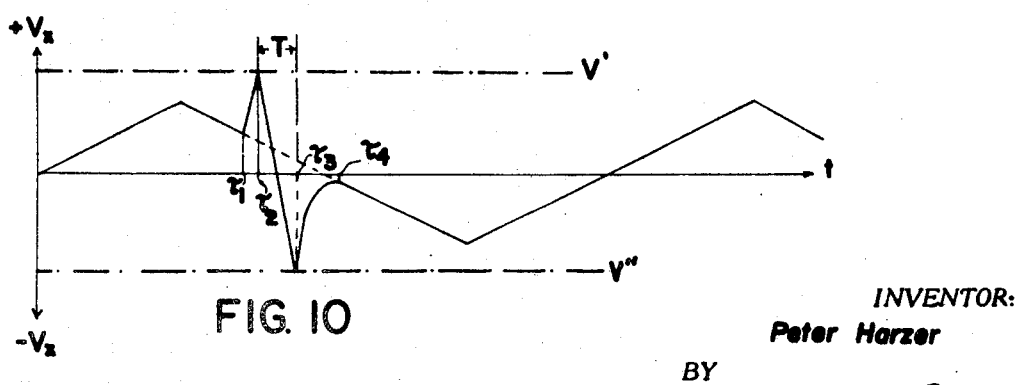
FIG. 10
INVENTOR:
Peter Harzer
BY
Karl F. Ross
Attorney INVENTOR:
Peter Harzer

BY

Karl F. Ross
Attorney

SWEEP CIRCUIT FOR OSCILLOSCOPE

My present invention relates to an oscilloscope as used, for example, to visualize a signal voltage produced in the output of a test circuit having a predetermined input voltage applied thereto.

In several commonly owned U.S. Pats., including Nos. 3,461,385 and 3,584,295, means have been disclosed for energizing such a test circuit with a continuously varying test frequency, with conversion of the alternating output voltage into a d-c message signal indicating the attenuation and/or phase characteristic of the circuit throughout a selected frequency band. This message signal may be visually compared with a reference signal, e.g. as transmitted through a standard pad, by displaying both signals simultaneously or in rapid alternation on the luminescent screen of a cathode-ray tube.

A conventional oscilloscope suitable for this purpose has a first sweep circuit for deflecting the electron beam in an $x$ direction (hereinafter referred to for convenience as horizontal) at a relatively slow rate and a second sweep circuit for oscillating the beam in an orthogonally related $y$ direction (referred to as vertical) at a relatively fast rate, e.g. a rate of 1 to 20 kilocycles per cycle of horizontal deflection. The beam, which normally is kept suppressed, thus traces an imaginary raster or grid on the oscilloscope screen; whenever the message signal to be visualized corresponds to the instantaneous magnitude of the vertical deflection signal, as determined by a voltage or current comparator, the beam is momentarily turned on so as to produce a luminous dot on the screen. A succession of such dots during consecutive vertical sweeps traces a straight line or a curve representing the law of variation of the measured parameter as a function of time and/or frequency. Such an oscilloscope enables the simultaneous display of several functions derived from different test objects. In order to provide a sharp trace, the beam can be brightened only for a very small fraction of an oscillatory cycle of its vertical sweep, e.g. for a period of 50 to 100 ns, if the horizontal sweep has a repetition period of about one second. In order to provide a degree of brightness comparable to that of a line continuously traced by the unsuppressed beam, the intensity of the cathode ray would have to be magnified some 500 to 1,000 times. Such an acceleration of the electrons, however, would tend to defocus the beam. This drawback of relatively low luminosity is particularly apparent with screens of long afterglow as preferentially used in such oscilloscopes.

The general object of my present invention, therefore, is to provide an improved oscilloscope for the purpose set forth which remedies the above disadvantage, as well as an improved method of operating such an oscilloscope.

In accordance with an important feature of my invention, the comparator ascertaining correspondence between an input signal and the "vertical" sweep signal controls the vertical-sweep circuit and interrupts, momentarily, the displacement of the beam in the $y$ direction; this interruption coincides with the brightening of the beam and should last for a fraction of an oscillatory cycle, preferably for a period sufficient to let the resulting horizontal trace extend over about 10 to 50 times the diameter of the luminous spot produced by the beam. This period is measured by a pulse generator, such as a monostable multivibrator or mono-flop, forming part of the comparison means.

If the vertical-sweep generator includes an oscillator whose tank circuit comprises a reactance directly generating the beam-deflecting variable (i.e. a sinusoidal current current in the case of an inductance or a sinusoidal voltage in the case of a capacitance), the sweep can be arrested by short-circuiting the inductive branch or open-circuiting the capacitive branch of that test circuit. In a preferred system embodying the invention, the beam is electromagnetically deflected by a coil forming part of the inductive branch of the corresponding tank circuit. Upon a shorting of this coil by a normally open switch, the inductivity of the coil tends to maintain a constant current flow through the coil and the switch in series therewith. Actually, of course, this current decreases progressively on account of the inherent ohmic resistance of the switch and the coil; during the short triggering and interruption interval (e.g. about 1 – 5 $\mu$s) here considered, however, the current and therefore the deflecting electromagnetic field may be regarded as invariant.

According to a more specific feature of my invention, the deflecting coil may be connected in series with an ancillary high-Q inductance of considerably higher inductivity (e.g. 5 – 10 times as high) which, upon a short-circuiting of the coil by the arresting switch, carries an oscillatory current of only slightly higher frequency in a loop closed by that switch which includes the capacitive branch of the test circuit. With the loop current passing through the switch in opposition to the coil current, the net current flow through the switch is minimized.

The input signals to be displayed by the oscilloscope may include, besides a message signal to be visualized, a reference signal of predetermined though advantageously adjustable magnitude serving to trace a straight horizontal line on the screen; in such a case, pursuant to a further feature of my invention, the triggering of the beam and the halting of the vertical sweep may be extended for a full horizontal sweep cycle which is concurrently accelerated to coincide, substantially, with an oscillatory cycle of the vertical-sweep generator. In this manner, a horizontal base line of selected level can be traced upon a single switch closure, e.g. during an interval of 1 ms or less. For visual persistence, such a tracing need not recur more often than after a number of $n$ vertical sweep cycles, with $n$ preferably equaling at least 20. For this purpose, a timer such as a monoflop may block for $(n-1)$ cycles the operation of a comparator connected to a source of reference voltage without affecting the operation of another comparator receiving the message signal.

The above and other features of my invention will be described in detail hereinafter with reference to the accompanying drawing in which:

FIG. 1 is a graph showing the conventional tracing of a curve on an oscilloscope of the general type here considered;

FIG. 2 is a similar graph illustrating my present improvement;

FIGS. 5 and 6 are two graphs representing the current and the voltage generated in the vertical-sweep circuit of the system of FIG. 4;

FIGS. 8 and 9 are two graphs similar to FIGS. 5 and 6 but representing another phase of operation; and FIG. 10 is a further graph showing the driving voltage of the horizontal-sweep circuit during the operating phase represented by FIGS. 8 and 9.

FIG. 1 shows the flow of current $i_y$ as a function of time $t$ in an electromagnetic deflection yoke of a conventional oscilloscope whose beam, normally suppressed, traces an imaginary grid on the screen by oscillating vertically along a sine curve at a rate of, say, one or several kHz while reciprocating horizontally at a rate on the order of, say, one Hz. At points P the beam is momentarily brightened in response to a trigger signal applied to the control grid of the tube; this brightening recurs during successive vertical sweeps (and on both the ascending and the descending branch of a single sweep) so that, to the eye, a continuous curve C is traced on the screen. For the reasons noted above, however, this trace is relatively faint unless extraordinarily complex circuitry is used to intensify the beam without excessive defocusing.

FIG. 2 shows the same yoke current $i_y$ plotted against time $t$ in a system according to my invention. At the instants P', when the beam is brightened, the vertical sweep is arrested so that the beam traces a succession of short and nearly horizontal lines on the screen. The length of each of these traces may exceed the diameter of the luminous dots (points P in FIG. 1) by one or two orders of magnitude, preferably by a factor of 10 to 50; because of the closeness of the raster, these traces will not actually appear as line segments to the naked eye but will merely manifest themselves as considerably brightened luminous spots again merging into a continuous curve C.

It will be noted that in FIG. 2 the beam is brightened only on the ascending sweep; this is true because, in the embodiment more fully described hereinafter, the comparison circuit triggering the brightness control includes a monoflop whose off-normal period measures the length of the trace and whose recovery period is larger than a half-cycle of the oscillatory sweep so that a trigger pulse is emitted only once per cycle.

Figure 3:
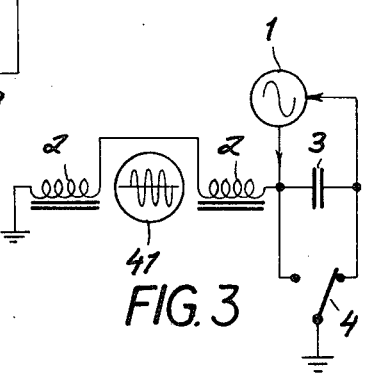
FIG. 3 is a circuit diagram showing the basic components of a sweep-control system according to my invention.

FIG. 3 shows a circuit arrangement for briefly arresting the vertical sweep in the manner illustrated in FIG. 2. The system of FIG. 3 comprises a sine-wave oscillator 1 whose tank circuit includes an inductance 2 and a capacitance 3, with the feedback loop of the oscillator bridged across the capacitor. A switch 4, shown for the sake of illustration as a reversing contact but actually constituted by a transistor as described below with reference to FIG. 7, normally connects the reactances 2 and 3 in an oscillatory circuit whose natural frequency — e.g. of one kHz — is determined by the magnitudes of these reactances as is well known per se. Coil 2 constitutes an electromagnetic deflection yoke for the beam of a cathode-ray tube 41, effective in the vertical or y direction. A recurrent trigger signal applied to the brightness control of tube 41 briefly reverses the switch 4 so that capacitor 3 is open-circuited and coil 2 is shorted. Under these circumstances the output of the oscillator amplifier, operating as a high-resistance current source, is substantially constant, as is the short-circuit current flowing through the coil. When the switch 4 is thereafter restored to normal, the cycle continues from the point it had reached at the time of interruption.

The system of FIG. 3 is theoretically satisfactory but entails the inconvenience of a large current flow through the switch 4. Since the switch has a finite ohmic resistance, the time during which the yoke current may be regarded as constant is thus relatively short.

Figure 4:
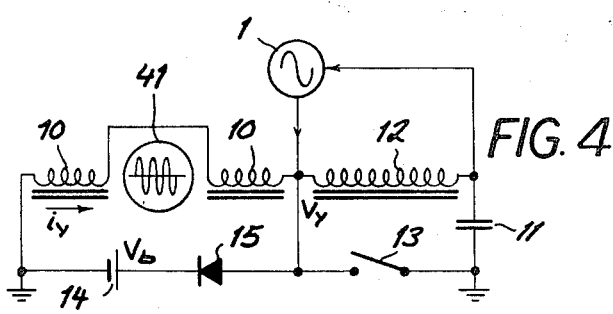
FIG. 4 is a diagram similar to FIG. 3, illustrating an alternate embodiment.

FIG. 4 illustrates an improved sweep-control system in which the tank circuit of oscillator 1 comprises a deflectoin coil 10 associated with tube 41, a capacitor 11, and an ancillary inductance 12 of high Q-value whose inductivity may be about 10 times that of coil 10. During normal operation, i.e. in the open state of a switch 13, inductances 10 and 12 are connected with capacitance 11 in an oscillatory circuit completed through a common ground. The operating frequency of the oscillator is thus determined by the combined inductance of coils 10 and 12.

Switch 13, upon closing, grounds the junction of the two coils and establishes an alternate resonant loop consisting of inductance 12 and capacitance 11. The natural frequency of this loop is only slightly higher than that of the aforedescribed oscillatory circuit, owing to the exclusion of coil 10, so that the loop current traversing the switch 13 nearly balances the short-circuit current drawn by the coil 10. During switch closure, i.e. between times $t_1$ and $t_2$ as illustrated in FIGS. 5 and 6, the deflection current $i_y$ is again substantially constant while the voltage $V_y$ across the coil 10 drops to zero. When the switch 13 reopens at time $t_2$, the additional charge accumulated on capacitor 11 during the interruption period results in the development of a large transient voltage across the coil; to limit the magnitude of that transient voltage, I provide in parallel with coil 10 a clamping circuit including a source 14 of biasing potential $V_b$ (shown as a battery) and a diode 15 in series therewith. Biasing potential $V_b$ thus determines the maximum value to which the voltage $V_y$ may rise; at a subsequent time $t_3$, the resulting equalizing flow through coil 12 re-establishes the normal operating conditions so that the voltage $V_y$ returns to its sinusoidal shape.

Figure 7:
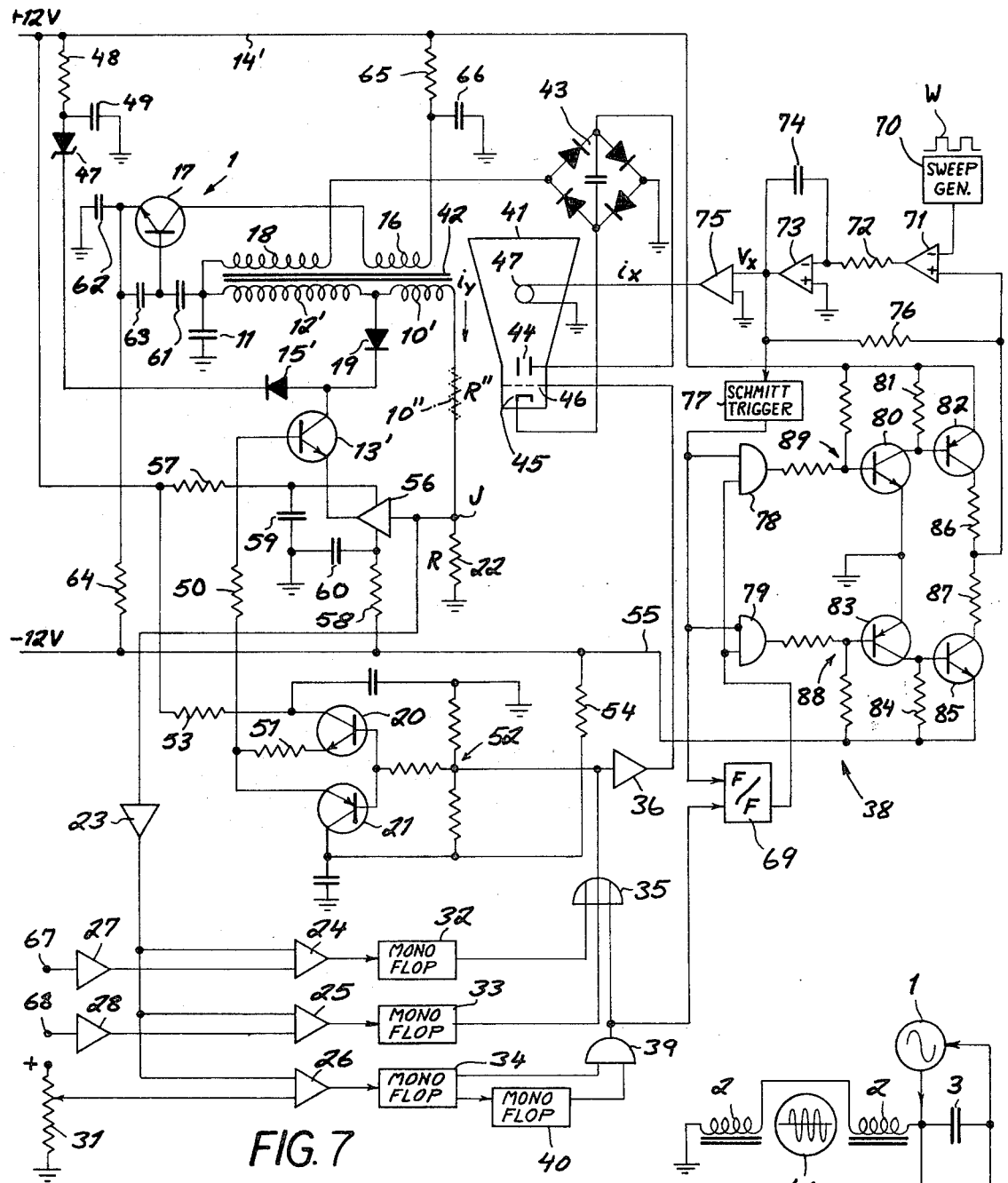
FIG. 7 is a more detailed circuit diagram relating to the system of FIG. 4.

Reference will now be made to FIG. 7 for a description of a comprehensive system embodying the features discussed in conjunction with FIG. 4. In this Figure, inductances 10 and 12 are represented by secondary windings 10' and 12' of a common transformer 42 also having a primary winding 16 and a further secondary winding 18, the latter generating a high positive voltage applied via a rectifier 43 to an accelerating anode 44 of cathode-ray tube 41. This tube is also shown provided with an electron gun 45 and a brightness-control grid 46 as well as a coil 47 for the horizontal deflection of its beam.

The switch 13 of FIG. 4 is represented in FIG. 7 by an NPN transistor 13' whose collector is tied to the junction of windings 10' and 12' through a protective diode 19. Another diode 15', which is the counterpart of diode 15 in FIG. 4, connects this collector to a source of biasing potential here represented by a positive bus bar 14', the connection including a Zener diode 47, a series resistor 48 and a shunt condenser 49.

The base of switching transistor 13' is connected through a resistor 50 to an emitter-follower stage comprising a pair of complementary transistors 20 (NPN) and 21 (PNP) whose emitters are interconnected by means of a resistor 51. The bases of these two transistors are joined, through a resistance/capacitance network 52, to the output of an OR gate 35 also feeding the control grid 46 by way of an amplifier 36. The collector of transistor 20 is tied to positive bus bar 14' through a resistor 53, a similar resistor 54 connecting the collector of transistor 21 to a negative bus bar 55; in the example shown, bus bars 14' and 55 carry voltages of +12V and −12V, respectively.

At 10'' I have illustrated, schematically, the inherent series resistance of coil 10' which is grounded through a physical resistor 22. The junction J of resistor 22 and virtual resistance 10'' (i.e. coil 10) is connected through an operational amplifier 56 to the emitter of switching transistor 13', amplifier 56 receiving its driving voltage from bus bars 14' and 55 between which it is connected in series with a pair of resistors 57, 58; two associated shunt condensers have been shown at 59 and 60.

Another NPN transistor 17, constituting the active element of oscillator 1, has its base and emitter connected across sweep capacitor 11 by way of coupling condensers 61, 62; the input circuit of this transistor also includes a shunt capacitor 63 and a resistor 64 connecting its emitter to negative bus bar 55.

The primary circuit of transformer 42 is completed through a series resistor 65, inserted between bus bar 14' and winding 16, and a shunt condenser 66.

Junction point J is also connected through an amplifier 23 to a first input of each of three comparators 24, 25, 26. The second inputs of comparators 24 and 25 receive respective message signals from associated input terminals 67 and 68 by way of amplifiers 27 and 28; these message signals may be supplied by the outputs of two test circuits to be monitored alternately or simultaneously. The corresponding input of the third comparator 26 is connected to the slider of a potentiometer 31 serving as an adjustable source of reference voltage.

Amplifiers 24 and 25 work into respective monoflops 32 and 33 whose off-normal outputs are tied to two of the three inputs of OR gate 35. A third monoflop 34, trippable by comparator 26, has its off-normal output connected to one input of an AND gate 39 whose other input is tied to the off-normal output of a further monoflop 40 trippable by the normal output of monoflop 34. AND gate 39 feeds the third input of OR gate 35 and, in parallel therewith, the setting input of a flip-flop 69 forming part of a switchover circuit generally designated 38; the purpose of this switchover circuit is to accelerate, under conditions described hereinafter, the horizontal beam deflection effected by the coil 47. This deflection normally proceeds in the rhythm of a square wave W produced by a sweep generator 70 whose output reaches the coil 47 through an operational amplifier 71, a series resistor 72, an integrating amplifier 73 with feedback condenser 74, and a further amplifier stage 75 acting as a current source. Another feedback loop is completed through a resistor 76 from the output of integrator 73 to the noninverting input of amplifier 71 whose inverting input is energized from sweep generator 70. Amplifier 73 also works into a Schmitt trigger 77 whose output is fed in parallel to one input of an AND gate 78, an inverting input of an AND gate 79 and the resetting input of flip-flop 69; the set output of this flip-flop feeds the remaining inputs of AND gates 78 and 79. The output of AND gate 78 is tied to the base of an NPN transistor 80 whose collector is energized from bus bar 14' through a resistor 81 and is connected to the base of a PNP transistor 82 having its emitter directly connected to that bus bar; in a symmetrical manner, the output of AND gate 79 is tied to the base of a PNP transistor 83 whose collector, energized from bus bar 55 by way of a resistor 84, is connected to the base of another NPN transistor 85. The collectors of transistors 82 and 85 are connected through respective resistors 86, 87 to the noninverting input of operational amplifier 71. Voltage dividers 88, 89 are inserted between AND gates 78, 79 and transistor stages 80, 83.

Normally, the square wave W issuing from generator 70 is inverted by amplifier 71 and integrated by amplifier 73 to yield a triangular voltage $V_x$ (see FIG. 10), giving rise to a corresponding triangular current in coil 47. The cadence of square wave W, and therefore the frequency of the horizontal sweep, may equal one Hz, the beam thus moving back and forth across the screen once per second.

With OR gate 35 nonconducting, amplifier 36 has no positive output so that the beam is substantially blanked by the grid 46. Transistor 21 conducts while transistor 20 is cut off, thereby blocking the switching transistor 13' so that the vertical deflection at the natural frequency of circuit 10', 11, 12' proceeds without interruption. The deflection current $i_v$ passes through resistor 22 to generate a sinusoidal voltage communicated in parallel, via amplifier 23, to the three comparators 24–26.

Let us assume that input terminal 67 carries a signal voltage which, as amplified by device 27, matches at a given instant the output voltage of amplifier 23. At that instant the monoflop 32 is tripped and produces a short positive pulse which traverses the OR gate 35 and brightens the beam of tube 41. Transistor 21 becomes nonconductive and transistor 20 conducts to saturate the switching transistor 13' whose emitter is grounded via a negative-resistance path within amplifier 56. The gain of the latter amplifier is so chosen as to equal the ratio $(R'' + R)/R$ where R is the resistance of element 22 and $R''$ is the magnitude of the virtual resistance 10''. Thus, the negative resistance of amplifier 56 compensates for the ohmic resistance of the coil 10' which therefore operates as a pure inductance. Amplifier 56 may be replaced by a direct ground if the Q-value of coil 10' is sufficiently high to maintain the deflection current virtually constant for the desired length of time.

Essentially the same operation takes place when the comparator 25 responds to an input signal on terminal 68. The two monoflops 32 and 33 associated with comparators 24 and 25 may have different operating periods so that the interval $t_1-t_2$ (FIGS. 5 and 6) is different for the two test curves traced in response to these two input signals, thereby enabling these two curves to be visually distinguished by their brightness. It should be noted, however, that both these operating periods are a small fraction of a half-cycle T/2 of the vertical sweep illustrated in FIGS. 2, 5 and 6.

In principle, the reference signal derived from potentiometer 31 could be similarly treated to produce a horizontal base line, with the output of monoflop 34 directly applied to the third input of OR gate 35. In the more elaborate system illustrated in FIG. 7, however, the tracing of the base line is carried out at an accelerated rate through the intervention of switchover circuit 38, causing the beam to be horizontally deflected across the entire screen during a single oscillation cycle T. With monoflop 40 at rest, its output energizes the corresponding input of AND gate 39 which therefore conducts as soon as monoflop 34 is tripped and, for an interval T corresponding to the operating period of this monoflop, triggers the brightness control 46 and reverses the electronic switch 13' via OR gate 35 as previously discussed. At the same time $\tau_1$ FIG. 10, flip-flop 69 is set and opens the AND gate 79 to turn on the two-stage amplifier 83, 85 whereby current flows from the output of amplifier 73 via resistors 76 and 87 to negative bus bar 55 so that the noninverting input of amplifier 71 is driven sharply negative; the resulting negative output of amplifier 71, applied to the inverting input of integrator 73, results in a steep rise of the output voltage $V_x$ thereof (and consequently in the deflection current $i_x$) during an interval $\tau_1-\tau_2$. At this point, voltage $V_x$ reaches an upper threshold V' which lies above its normal positive peak and trips the Schmitt trigger 7 which now unblocks the AND gate 78 and blocks the AND gate 79, thereby causing conduction of two-stage amplifier 80, 82 in lieu of amplifier 83, 85. Current now flows from positive bus bar 14' through resistors 86 and 76 to the output of amplifier 73, thereby positively overdriving the amplifier 71 to generate a steep voltage reversal in the output of integrator 73. At a time $\tau_3 \approx \tau_2 + T$, the voltage $V_x$ reaches a lower threshold V'' which lies below its normal negative peak and turns off the Schmitt trigger 77. In response to this cutoff, flip-flop 69 is reset so that both AND gates 78, 79 are now blocked. A balancing current then traverses the resistor 76 until, at a time $\tau_4$, normal operation is re-established.

With the return of monoflop 34 to its stable condition, monoflop 40 is tripped so as to block the AND gate 39 for an extended period equal to, say, 19T. Thus, although comparator 26 senses a match between the output voltages of amplifier 23 and potentiometer 31 twice during each cycle T, OR gate 35 will be energized from AND gate 39 only during every 20th cycle. During such a cycle, as illustrated in FIGS. 8 and 9, the vertical deflection current $i_y$ remains substantially constant and the corresponding sweep voltage $V_y$ disappears for a full cycle T even as the beam races horizontally across the entire screen in a zig-zag motion taking it beyond the normal limits of its sweep. During that period, of course, the tracing of the curves corresponding to the signals on input terminals 67 and 68 is interrupted.

I claim:

1. In an oscilloscope, in combination:
    a cathode-ray tube provided with a screen and with an electron gun for training a beam upon said screen;
    first sweep means for displacing said beam in an x direction at a relatively slow rate;
    second sweep means for oscillating said beam at a relatively fast rate in a y direction orthogonal to said x direction;
    brightness-control means for normally keeping said beam substantially suppressed;
    comparison means connected to said second sweep means and to a source of input signals for triggering said brightness-control means to brighten said beam upon the deflection of the beam in said y direction corresponding to said input signal ; and
    switch means controlled by said comparison means for deactivating said second sweep means for interrupting the beam displacement in said y direction during the triggering of said brightness-control means.

2. The combination defined in claim 1 wherein said comparison means includes pulse-generating means for measuring a predetermined triggering and interruption interval.

3. The combination defined in claim 2 wherein said pulse-generating means comprises a first pulse generator with an operating period equaling a small fraction of the oscillating frequency of said second sweep means and a second pulse generator with an operating period on the order of magnitude of said oscillating frequency, said input signals including a variable message signal and a predetermined reference signal, said comparison means being connected to operate said first pulse generator for displaying a trace of said message signal and to operate said second pulse generator for displaying a trace of said reference signal, said second pulse generator having an output connected to said first sweep means for accelerating said relatively slow rate during said interval.

4. The combination defined in claim 3, further comprising timing means responsive to operation of said second pulse generator for deactivating same, following the display of a trace of said reference signal, for a multiplicity of oscillating cycles of said second sweep means.

5. The combination defined in claim 4 wherein said first sweep means is switchable, under the control of said second pulse generator, to a rate of beam displacement substantially equaling one sweep cycle per cycle of said oscillating frequency, the operating period of said second pulse generator being substantially equal to the latter cycle.

6. The combination defined in claim 1 wherein said second sweep means comprises an oscillator provided with a tank circuit having an inductive branch and a capacitive branch, said switch means being actuatable by said comparison means to short-circuit at least a part of said inductive branch.

7. The combination defined in claim 6 wherein said switch means is operative to open-circuit said capacitive branch upon being actuated by said comparison means.

8. The combination defined in claim 6 wherein said inductive branch includes an electromagnetic deflection coil for said beam short-circuitable by said switch means.

9. The combination defined in claim 8 wherein said inductive branch further comprises a high-Q inductance of substantially higher inductivity in series with said coil, said switch means being operative to close an alternate resonance circuit through said inductance and said capacitive branch upon short-circuiting said coil.

10. The combination defined in claim 9 wherein the inductivity of said inductance exceeds that of said coil by an order of magnitude.

11. The combination defined in claim 9 wherein said coil and said inductance are respective windings of a common transformer.

12. The combination defined in claim 11 wherein said transformer is provided with a further winding for generating an accelerating voltage for the electrons of said beam.

13. The combination defined in claim 9 wherein said oscillator includes amplification means for compensating the ohmic resistance of said coil during the short-circuiting thereof.

14. The combination defined in claim 9, further comprising a clamping circuit connected to said tank circuit for limiting a voltage surge across said coil upon restoration of said switch means to normal.

15. The combination defined in claim 14 wherein said clamping circuit includes a diode connected across said coil in series with a source of biasing potential.

16. A method of operating a cathode-ray oscilloscope for visualizing an input variable on a luminescent screen thereof, comprising the steps of:

periodically deflecting an electron beam of said oscilloscope across said screen in a first direction at a relatively slow rate and in a second direction orthogonal thereto at a relatively fast rate;

normally keeping said beam substantially suppressed;

brightening said beam for a limited period upon the deflection in a second direction attaining a value corresponding to an input signal to be visualized, said period being substantially shorter than a deflection cycle in said second direction; and concurrently halting the deflection of said beam in said second direction for the duration of said period.

* * * * *